(12) United States Patent
Hatakeda et al.

(10) Patent No.: US 10,950,880 B2
(45) Date of Patent: Mar. 16, 2021

(54) FUEL GAS INJECTION DEVICE AND FUEL CELL SYSTEM

(71) Applicant: HONDA MOTOR CO., LTD., Tokyo (JP)

(72) Inventors: Tomohiko Hatakeda, Wako (JP); Yuji Terasawa, Wako (JP); Kazuya Mizumoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 64 days.

(21) Appl. No.: 16/364,343

(22) Filed: Mar. 26, 2019

(65) Prior Publication Data

US 2019/0305337 A1 Oct. 3, 2019

(30) Foreign Application Priority Data

Mar. 28, 2018 (JP) .............................. JP2018-060989

(51) Int. Cl.
*H01M 8/04082* (2016.01)
*H01M 8/04746* (2016.01)

(52) U.S. Cl.
CPC ... *H01M 8/04201* (2013.01); *H01M 8/04753* (2013.01)

(58) Field of Classification Search
CPC ...................... H01M 8/04201; H01M 8/04753
See application file for complete search history.

(56) References Cited

U.S. PATENT DOCUMENTS

2018/0178641 A1\* 6/2018 Yamafuji ................ B60L 50/71

FOREIGN PATENT DOCUMENTS

| JP | 2010267553 A | \* | 11/2010 | .............. H01M 8/04 |
| JP | 2017-084457 | | 5/2017 | |

OTHER PUBLICATIONS

Machine Translation JP2010267553A (Year: 2010).\*

\* cited by examiner

*Primary Examiner* — Victoria H Lynch
(74) *Attorney, Agent, or Firm* — Amin, Turocy & Watson, LLP

(57) ABSTRACT

A fuel gas injection device of a fuel cell system includes an injector device and an ejector device. Mount portions of the injector device each include a mount body joined to a distal-side support portion, a screw member joining the mount body and an ejector body to each other in a state in which the screw member extends in an operating direction of a plunger, and a mount rubber member disposed on an outer circumferential side of a shaft portion of the screw member.

18 Claims, 6 Drawing Sheets

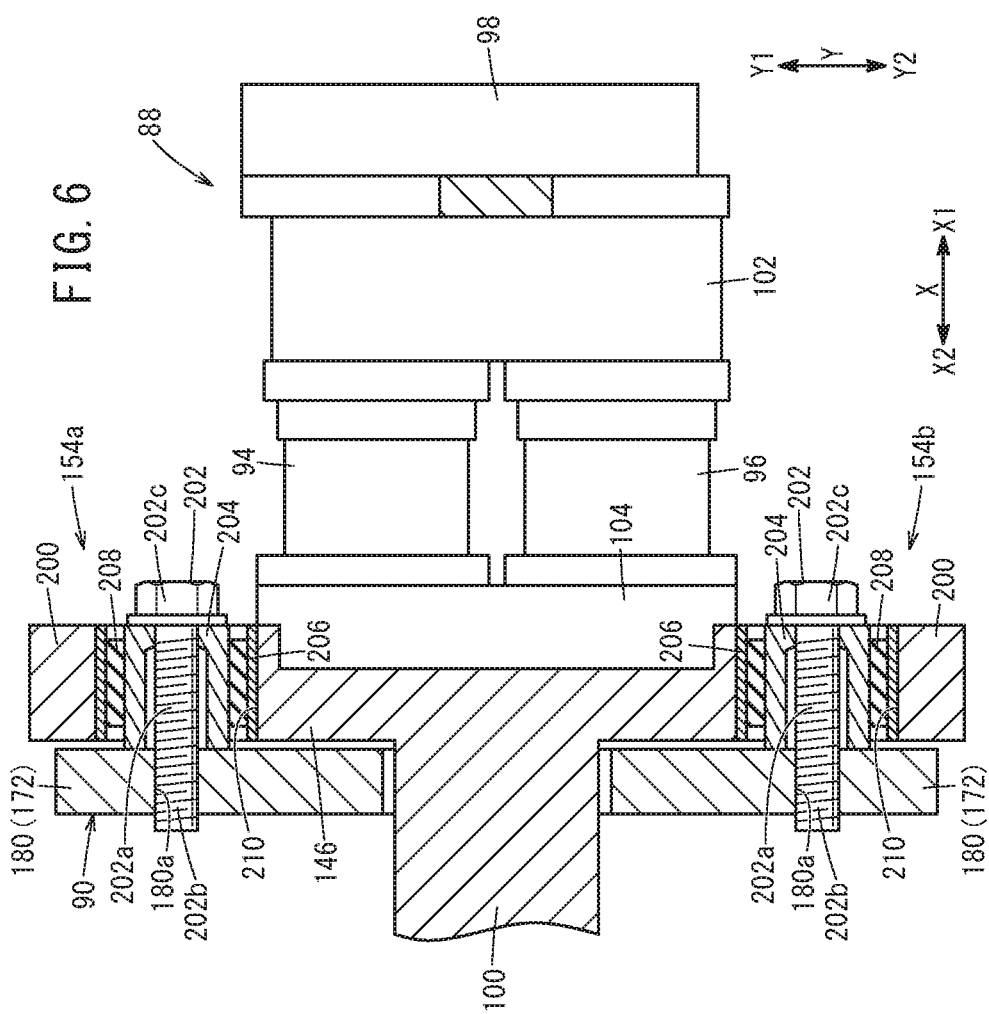

FUEL GAS INJECTION DEVICE AND FUEL CELL SYSTEM

CROSS-REFERENCE TO RELATED APPLICATION

This application is based upon and claims the benefit of priority from Japanese Patent Application No. 2018-060989 filed on Mar. 28, 2018, the contents of which are incorporated herein by reference.

BACKGROUND OF THE INVENTION

Field of the Invention

The present invention relates to a fuel gas injection device for supplying a fuel gas to a fuel cell, and to a fuel cell system.

Description of the Related Art

Japanese Laid-Open Patent Publication No. 2017-084457 discloses a fuel gas injection device having a plurality of injectors and an ejector. This fuel gas injection device is accommodated in a cover portion fixed to a fuel cell stack, and has a plurality of mount portions that are attached to the cover portion.

The mount portion has a screw member (fixing member) extending in a direction orthogonal to a direction in which the plungers of the injectors operate, and a rubber member provided in an annular form on an outer circumferential side of the screw member. The rubber member reduces transmission, to the cover portion, of vibration (hammering sound of the plungers) generated during operation of the injectors.

SUMMARY OF THE INVENTION

The present invention has been made in relation to the proposal above, and an object of the present invention is to provide a fuel gas injection device and a fuel cell system capable of efficiently reducing transmission, to an external support member, of vibration generated during operation of an injector.

In order to achieve the object above, a fuel gas injection device according to the present invention includes an injector device including an injector for injecting a fuel gas, and an ejector device that includes an ejector body attached to an external support member and to which the fuel gas injected from the injector is guided, the fuel gas of the ejector device being supplied to a fuel cell. The injector device includes: an injector support portion supporting the injector; a rubber member disposed between the injector and the injector support portion; and a mount portion for attaching the injector support portion to the ejector body. The mount portion includes: a mount body joined to the injector support portion; a fixing member for joining the mount body and the ejector body to each other, with the fixing member extending in an operating direction of a plunger of the injector; and a mount rubber member disposed on an outer circumferential side of a shaft portion of the fixing member.

According to the configuration above, vibration occurring during operation of the injector is damped primarily by the rubber member, transmitted to the injector support portion, and then damped secondarily by the mount rubber member, and transmitted to the external support member through the ejector body. In this process, since the mount rubber member is disposed on the outer circumferential side of the fixing member extending along the operating direction of the plunger, it is possible to efficiently damp the vibration transmitted from the injector support portion to the ejector body along the operating direction of the plunger. It is therefore possible to efficiently damp the transmission, to the external support member, of the vibration occurring during operation of the injector.

In the fuel gas injection device above, the injector support portion may include: a distal-side support portion supporting a distal portion of the injector; and a proximal-side support portion supporting a proximal portion of the injector, and the rubber member may include: a distal-side rubber member held between the injector and the distal-side support portion from the operating direction of the plunger; and a proximal-side rubber member held between the injector and the proximal-side support portion from the operating direction of the plunger.

According to the configuration above, the vibration transmitted toward the distal side during operation of the injector is primarily damped by the distal-side rubber member and then secondarily damped by the mount rubber member. Further, the vibration transmitted toward the proximal side during operation of the injector is damped by the proximal-side rubber member. It is thus possible to further efficiently reduce the transmission, to the external support member, of the vibration occurring during operation of the injector.

In the fuel gas injection device above, the mount rubber member may have a hardness that is lower than a hardness of the distal-side rubber member and a hardness of the proximal-side rubber member.

According to the configuration above, low frequency components of the vibration occurring during operation of the injector can be effectively damped by the distal-side rubber member and proximal-side rubber member. Further, high frequency components of the vibration occurring during operation of the injector can be effectively damped by the mount rubber member.

In the fuel gas injection device above, the injector device may include a plurality of the injectors disposed in parallel, the distal-side rubber member may extend so as to surround the distal portion of each of the injectors, and the proximal-side rubber member may extend so as to surround the proximal portion of each of the injectors.

According to the configuration above, the vibration occurring during operation of the plurality of injectors can be efficiently damped by the distal-side rubber member and the proximal-side rubber member.

In the fuel gas injection device above, the mount portion may include: an annular inside member fixed to the ejector body by the fixing member; and an annular outside member bonded to the mount body while being disposed on an outer circumferential side of the inside member, and the mount rubber member may abut on an outer surface of the inside member and an inner surface of the outside member.

According to the configuration above, the vibration transmitted from the distal-side support portion to the outside member can be damped by the mount rubber member and then transmitted to the ejector body through the inside member.

In the fuel gas injection device above, the mount portion may comprise a plurality of the mount portions that are disposed in a point symmetric manner about a center line of the injector device.

According to the configuration above, the vibration transmitted from the injector to the distal-side support portion can be further efficiently damped by the plurality of mount portions.

In the fuel gas injection device above, the ejector body may have a hole portion in which a part of the distal-side support portion is inserted, and a rubber seal member in contact with an inner surface forming the hole portion may be attached to the part of the distal-side support portion that is inserted in the hole portion.

According to the configuration above, the vibration transmitted from the injector to the distal-side support portion can be damped by the rubber seal member.

A fuel cell system according to the present invention includes a fuel cell and the fuel gas injection device described above.

According to the present invention, the vibration occurring during operation of the injector can be primarily damped by the rubber member and then secondarily damped by the mount rubber member. It is therefore possible to efficiently reduce transmission, to the external support member, of the vibration occurring during operation of the injector.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 6 is a partially omitted longitudinal section view taken along line VI-VI in FIG. 5.

DESCRIPTION OF THE PREFERRED EMBODIMENTS

The fuel gas injection device and fuel cell system according to the present invention will now be described in conjunction with preferred embodiments with reference to the accompanying drawings.

Figure 1:
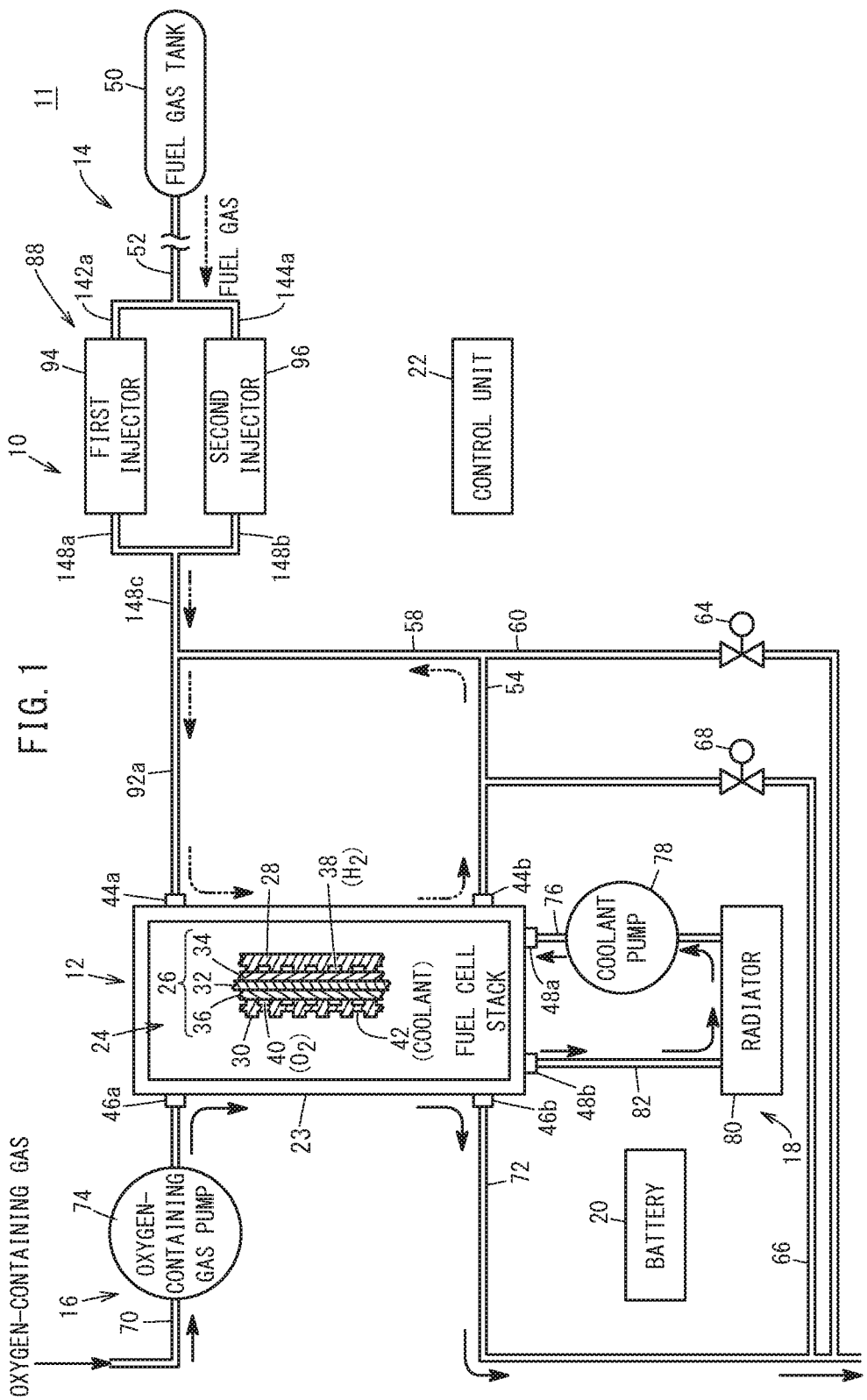
FIG. 1 is a schematic configuration diagram of a fuel cell system according to an embodiment of the present invention.

As shown in FIG. 1, a fuel cell system 11 according to an embodiment of the present invention is mounted on a fuel cell vehicle (not shown) such as a fuel-cell electric vehicle or the like, for example.

The fuel cell system 11 includes a fuel cell stack 12 (fuel cell). The fuel cell stack 12 is provided with a fuel gas supply device 14 for supplying a fuel gas, e.g. hydrogen gas, an oxygen-containing gas supply device 16 for supplying an oxygen-containing gas, e.g. the air, and a coolant supply device 18 for supplying a coolant. The fuel cell system 11 further includes a battery 20 as an energy storage device and a control unit 22.

Figure 2:
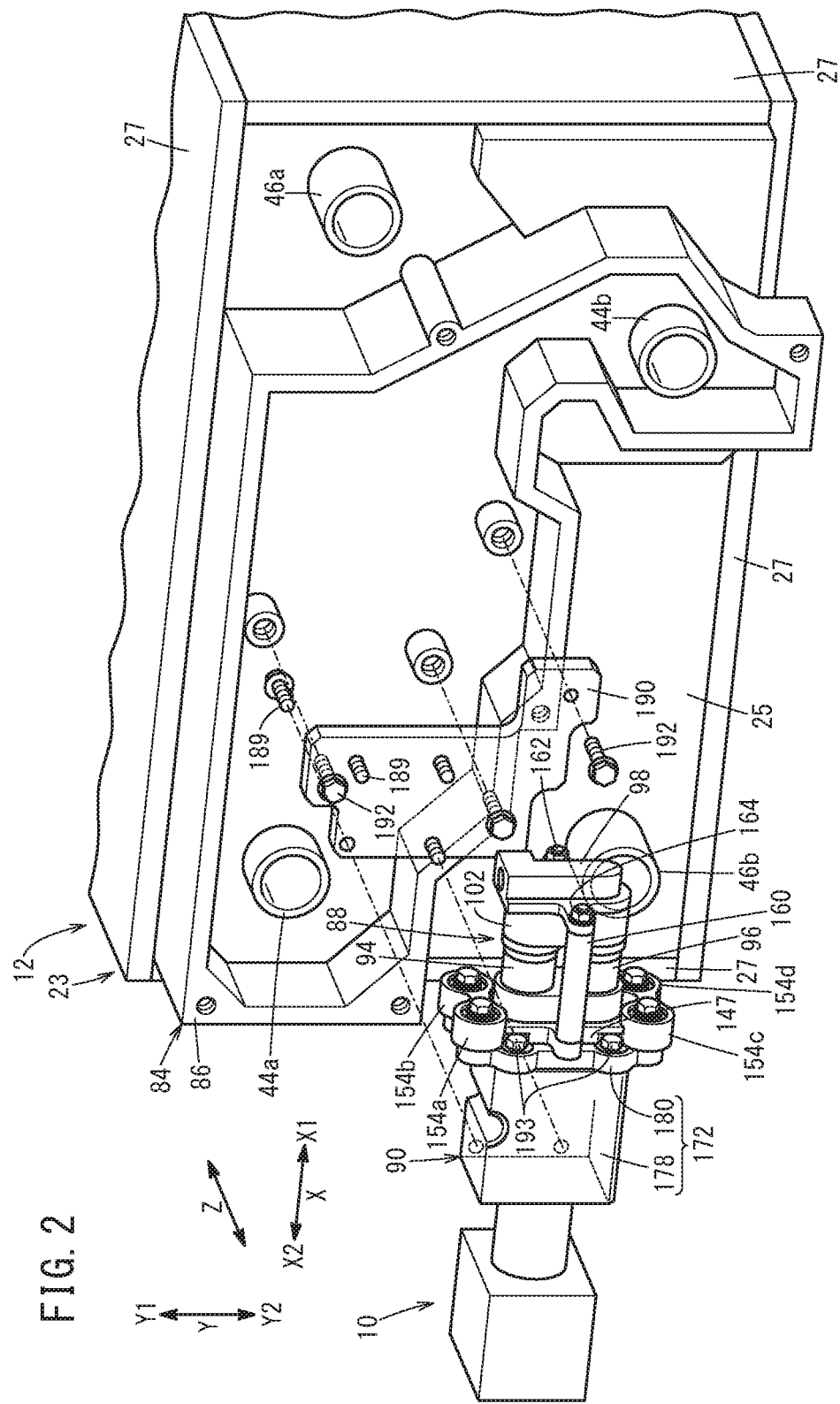
FIG. 2 is a partially omitted perspective view showing the fuel gas injection device of FIG. 1 and its vicinity.

The fuel cell stack 12 includes a plurality of power generation cells 24 stacked in a horizontal direction, and a fuel cell cover 23 that covers the power generation cells 24. As shown in FIGS. 1 and 2, the fuel cell cover 23 includes a set of end plates 25 positioned on both ends of the stacking direction (the direction of arrow Z) of the power generation cells 24, and four-side panels 27 covering from a direction orthogonal to the stacking direction of the power generation cells 24.

In FIG. 1, the power generation cell 24 includes a membrane electrode assembly 26, and a first separator 28 and a second separator 30 sandwiching the membrane electrode assembly 26 therebetween. The first separator 28 and the second separator 30 are made of a metal separator or carbon separator.

The membrane electrode assembly 26 includes a solid polymer electrolyte membrane 32 as a thin membrane of perfluorosulfonic acid containing water, for example, and an anode 34 and a cathode 36 holding the solid polymer electrolyte membrane 32 therebetween. The solid polymer electrolyte membrane 32 is made of a fluorine-based electrolyte, or an HC (hydrocarbon) based electrolyte.

A fuel gas flow field 38 for guiding the fuel gas to the anode 34 is provided between the first separator 28 and the membrane electrode assembly 26. An oxygen-containing gas flow field 40 for supplying the oxygen-containing gas to the cathode 36 is provided between the second separator 30 and the membrane electrode assembly 26. A coolant flow field 42 for passing the coolant (cooling medium) is provided between mutually adjacent first separator 28 and second separator 30.

The fuel cell stack 12 has a fuel gas inlet 44a, a fuel gas outlet 44b, an oxygen-containing gas inlet 46a, an oxygen-containing gas outlet 46b, a coolant inlet 48a, and a coolant outlet 48b. The fuel gas inlet 44a passes through each power generation cell 24 in the stacking direction and communicates with the supply side of the fuel gas flow field 38. The fuel gas outlet 44b passes through each power generation cell 24 in the stacking direction and communicates with the discharge side of the fuel gas flow field 38. The fuel gas flow field 38, fuel gas inlet 44a, and fuel gas outlet 44b constitute an anode flow field.

The oxygen-containing gas inlet 46a passes through each power generation cell 24 in the stacking direction and communicates with the supply side of the oxygen-containing gas flow field 40. The oxygen-containing gas outlet 46b passes through each power generation cell 24 in the stacking direction and communicates with the discharge side of the oxygen-containing gas flow field 40. The oxygen-containing gas flow field 40, oxygen-containing gas inlet 46a, and oxygen-containing gas outlet 46b constitute a cathode flow field.

The coolant inlet 48a passes through each power generation cell 24 in the stacking direction and communicates with the supply side of the coolant flow field 42. The coolant outlet 48b passes through each power generation cell 24 in the stacking direction and communicates with the discharge side of the coolant flow field 42.

The fuel gas supply device 14 includes a fuel gas tank 50 storing a high-pressure fuel gas (high pressure hydrogen), and the fuel gas in the fuel gas tank 50 is supplied to the fuel gas inlet 44a of the fuel cell stack 12 through a fuel gas supply path 52 and a fuel gas injection device 10. A specific configuration of the fuel gas injection device 10 will be described later.

As shown in FIG. 1, a fuel gas discharge path 54 communicates with the fuel gas outlet 44b of the fuel cell stack 12. The fuel gas discharge path 54 discharges a fuel off-gas (fuel exhaust gas) from the fuel cell stack 12, where the fuel off-gas is the remaining fuel gas which remains after the fuel gas has been at least partially consumed at the anode 34.

A circulation flow path 58 and a purge flow path 60 are connected to a downstream end of the fuel gas discharge path 54. The circulation flow path 58 guides the fuel off-gas to the fuel gas injection device 10.

A purge valve 64 is provided on the purge flow path 60. Connected to the fuel gas discharge path 54 is one end of a drainage flow path 66 for discharging fluid mainly containing liquid components. A drain valve 68 is provided on the drainage flow path 66.

The oxygen-containing gas supply device 16 includes an oxygen-containing gas supply path 70 communicating with the oxygen-containing gas inlet 46a of the fuel cell stack 12, and an oxygen-containing gas discharge path 72 communicating with the oxygen-containing gas outlet 46b of the fuel cell stack 12.

An oxygen-containing gas pump 74 for compressing and supplying an oxygen-containing gas (the air from the atmosphere) is provided on the oxygen-containing gas supply path 70. The oxygen-containing gas supply path 70 introduces the oxygen-containing gas into the fuel cell stack 12, and the oxygen-containing gas discharge path 72 discharges an exhaust oxygen-containing gas from the fuel cell stack 12, where the exhaust oxygen-containing gas is the remaining of the oxygen-containing gas which remains after the oxygen-containing gas has been at least partially consumed at the cathode 36.

The coolant supply device 18 includes a coolant supply path 76 connected to the coolant inlet 48a of the fuel cell stack 12. A coolant pump 78 is disposed on the coolant supply path 76. The coolant supply path 76 is connected to a radiator 80, and a coolant discharge path 82 communicating with the coolant outlet 48b is connected to the radiator 80.

Figure 3:
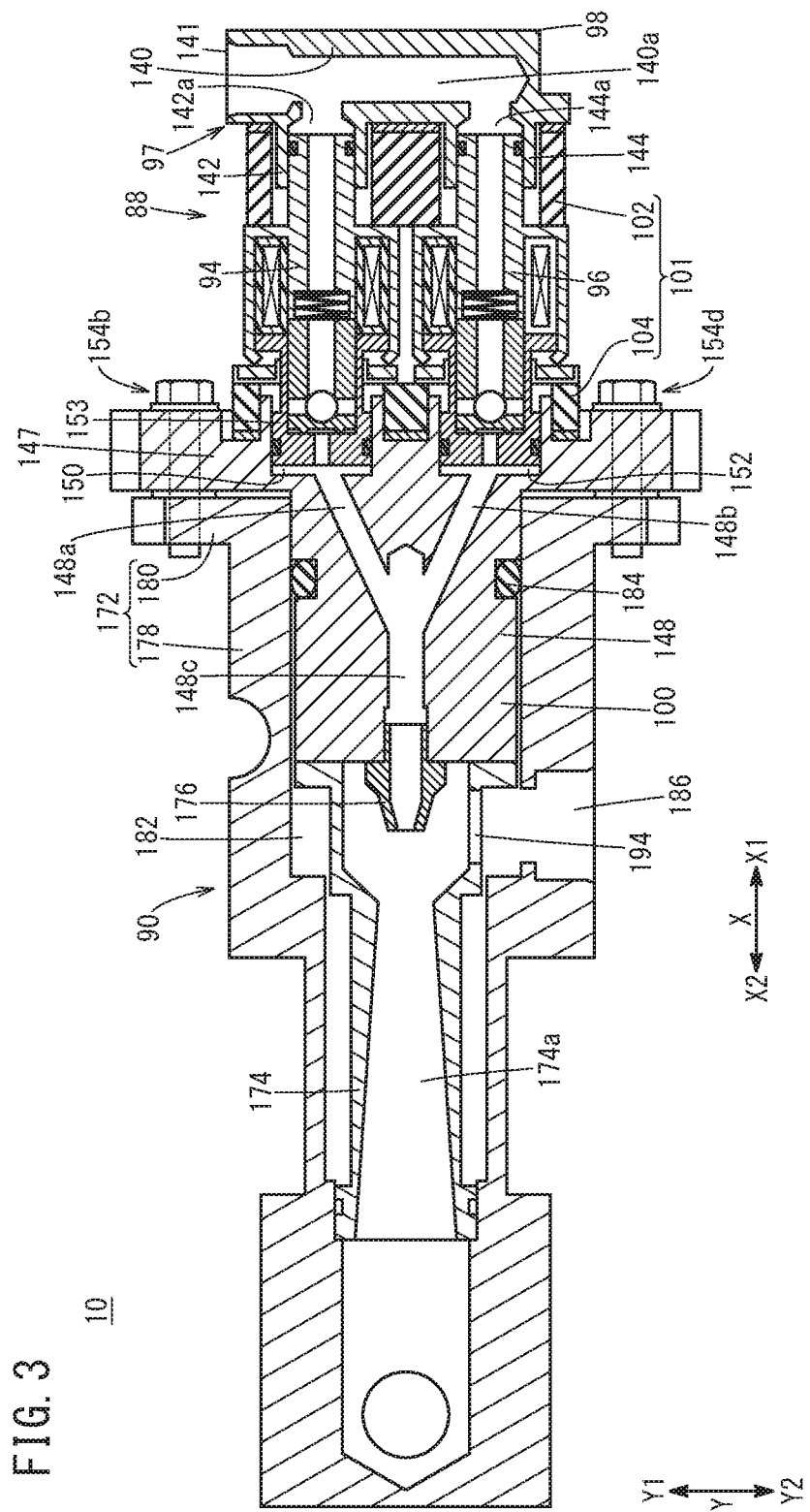
FIG. 3 is a longitudinal section view of the fuel gas injection device of FIG. 2.
Figure 4:
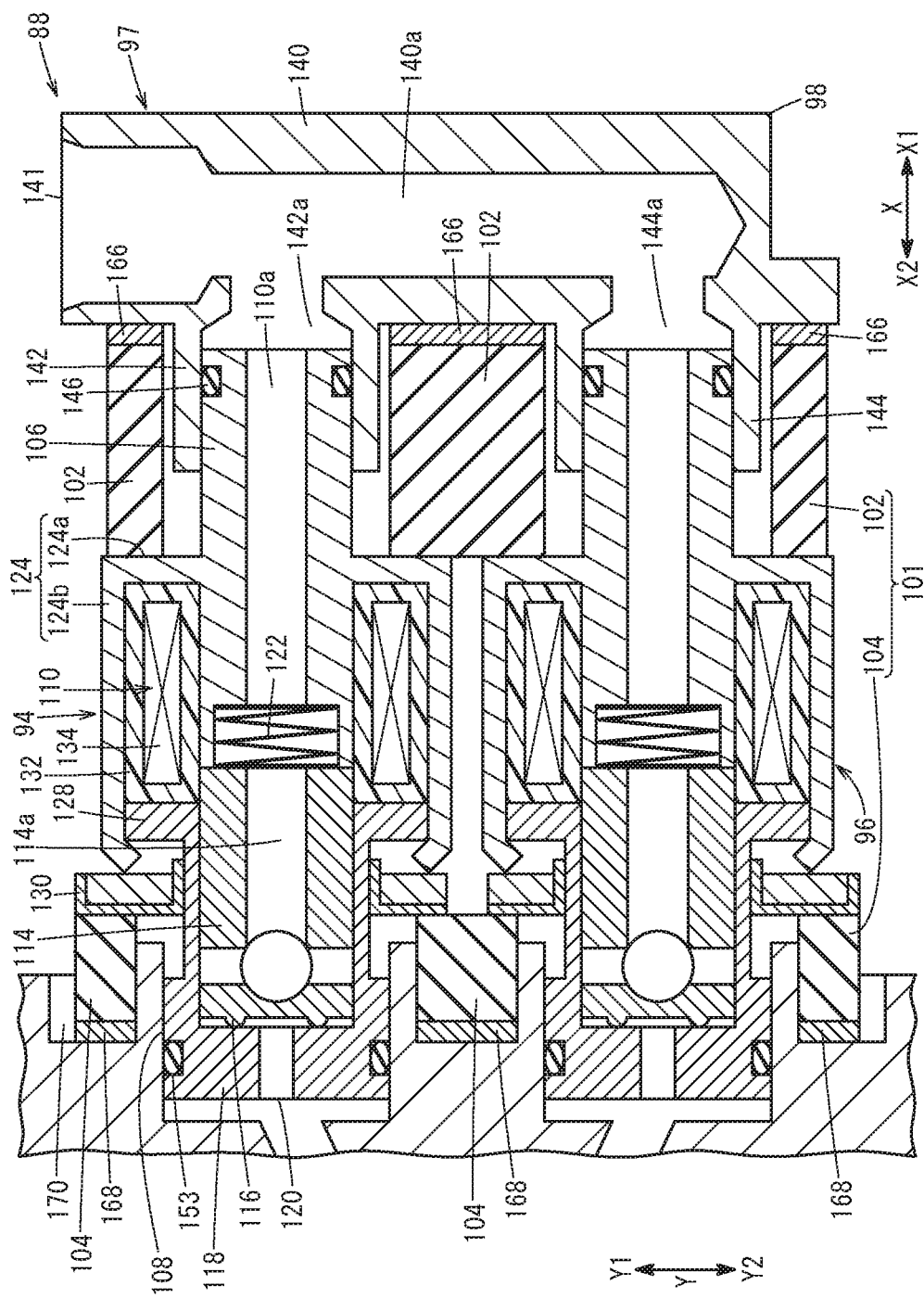
FIG. 4 is a partial enlarged view of FIG. 3.

As shown in FIGS. 2 to 4, the fuel gas injection device 10 is accommodated in a cover portion 84 fixed to the end plate 25 that is positioned at an end of the stacking direction of the power generation cells 24 and that has the fuel gas inlet 44a formed therein. The cover portion 84 is a casing formed of a cover portion main body 86 that is divided into two pieces in the stacking direction (the direction of arrow Z) of the power generation cells 24. The direction of arrow Z corresponds to a vehicle width direction, for example. Note that in FIG. 2 one of the pieces of the cover portion main body 86 is omitted. The cover portion 84 serves as an external support member that supports the fuel gas injection device 10.

Though not shown in detail graphically, members through which the fuel gas flows (e.g., the fuel gas discharge path 54, circulation flow path 58, etc.) are accommodated in the cover portion 84. The cover portion 84 prevents leakage of the fuel gas out of the fuel gas injection device 10 and the like. Further, the cover portion 84 functions as a noise barrier that reduces transmission, to occupants and the like, of noise (undesired sound) generated from the fuel gas injection device 10.

The fuel gas injection device 10 extends in a direction orthogonal to the stacking direction of the power generation cells 24 (in the direction of arrow X). The direction of arrow X corresponds to the front-rear direction of the vehicle, for example. The fuel gas injection device 10 includes an injector device 88 and an ejector device 90.

As shown in FIG. 3, the injector device 88 includes a first injector 94, a second injector 96, an injector support portion 97 (a proximal-side support portion 98 and a distal-side support portion 100), and a rubber member 101 (a proximal-side rubber member 102 and a distal-side rubber member 104).

As shown in FIG. 4, the first injector 94 includes a first body 106, a second body 108, and a coil portion 110. The first body 106 is a hollow member constituting a proximal side of the first injector 94 (a portion located in the direction of arrow X1). The first body 106 extends in an axis line direction of the first injector 94. The first body 106 has a first flow path 110a through which the fuel gas flows.

The second body 108 is a hollow member constituting a distal side of the first injector 94 (a portion located in the direction of arrow X2). Provided in the second body 108 are a plunger 114, a valve element 116 provided at the distal end of the plunger 114, and a valve seat 118 on which the valve element 116 rests. An injection hole 120 for injecting the fuel gas is formed in the valve seat 118.

The plunger 114 is made of a magnetic material such as iron, and operates in the axis line direction of the first injector 94 (in the direction of arrow X). The plunger 114 has a second flow path 114a through which the fuel gas flows. A spring 122 for energizing the plunger 114 in the distal direction is provided at a proximal portion of the plunger 114.

The coil portion 110 is covered by a coil cover portion 124 provided at the first body 106. The coil cover portion 124 includes an annular protruding portion 124a protruding radially outwardly from the first body 106, and a tubular portion 124b extending in the direction of arrow X2 from the protruding end of the annular protruding portion 124a. The annular protruding portion 124a is joined to a proximal side of the first body 106 in the direction of arrow X.

An extending end of the tubular portion 124b is fitted to a flange portion 128 protruding radially outwardly from a proximal portion of the second body 108. A distal-side holding portion 130 for supporting the distal side of the first injector 94 is attached to the flange portion 128.

The coil portion 110 has a solenoid 134 wound around an insulating bobbin 132. A current is supplied to the solenoid 134 from a connector (not shown) provided at the first body 106.

In the first injector 94 thus structured, when a current is supplied from the control unit 22 to the solenoid 134, the plunger 114 is displaced in the proximal direction (the direction of arrow X1) by excitation action of the solenoid 134. Thus, the valve element 116 is separated from the valve seat 118, opening the first injector 94. At this time, the proximal portion of the plunger 114 hits the distal surface of the first body 106 to generate a working sound (hammering sound).

On the other hand, when the supply of current from the control unit 22 to the solenoid 134 is cut off, the plunger 114 is displaced in the distal direction (the direction of arrow X2) by the energizing force of the spring 122. The valve element 116 then rests on the valve seat 118 and the first injector 94 closes. At this time, the valve element 116 hits the valve seat 118 to generate a working sound (hammering sound).

The second injector 96 is arranged in parallel to the first injector 94 in the direction of arrow Y that is orthogonal to the direction of arrow X. The direction of arrow Y corresponds to a vertical direction, for example. The first injector 94 and the second injector 96 are separated from each other. However, the first injector 94 and the second injector 96 may be joined to each other. The second injector 96 is structured in the same way as the first injector 94. The structure of the second injector 96 is therefore not described herein.

The injector support portion 97 serves to support the first injector 94 and second injector 96, which includes a proximal-side support portion 98 and a distal-side support portion 100. The proximal-side support portion 98 supports a proximal portion of the first injector 94 and a proximal portion of the second injector 96. The proximal-side support portion 98 includes a base portion 140, a first tubular portion 142, and a second tubular portion 144. The base portion 140 extends in the direction of arrow Y. The base portion 140 has an introducing flow path 140a formed along the direction in which it extends. The introducing flow path 140a has an opening 141 formed at one end (in the direction of arrow Y1) of the base portion 140, and piping (not shown) forming the fuel gas supply path 52 is fitted thereto.

The first tubular portion 142 and the second tubular portion 144 protrude from the base portion 140 in the direction of arrow X2. The first tubular portion 142 has a first inner hole 142a communicating with the introducing flow path 140a. An annular, proximal-side seal member 146 attached to a proximal portion of the first body 106 of the first injector 94 is in hermetic contact with an inner surface of the first tubular portion 142. That is, the first tubular portion 142 guides the fuel gas flowing in the introducing flow path 140a to the first injector 94.

The second tubular portion 144 is spaced from the first tubular portion 142 and positioned on an opposite side (in the direction of arrow Y2) to the opening of the base portion 140. The second tubular portion 144 has a second inner hole 144a communicating with the introducing flow path 140a. An annular, proximal-side seal member 146 attached to a proximal portion of the first body 106 of the second injector 96 is in hermetic contact with an inner surface of the second tubular portion 144. That is, the second tubular portion 144 guides the fuel gas flowing in the introducing flow path 140a to the second injector 96.

As shown in FIG. 3, the distal-side support portion 100 supports the distal portion of the first injector 94 and the distal portion of the second injector 96. The distal-side support portion 100 includes a plate-like, support portion main body 147 and a block-like, flow path forming portion 148 protruding in the direction of arrow X2 from the support portion main body 147.

The support portion main body 147 extends more outwardly than the flow path forming portion 148. The support portion main body 147 extends in the direction in which the first injector 94 and the second injector 96 are arranged (in the direction of arrow Y). A first supporting recessed portion 150 and a second supporting recessed portion 152 are formed in a surface of the support portion main body 147 that is directed in the direction of arrow X1. In FIG. 4, an annular, distal-side seal member 153 attached at a distal portion of the second body 108 of the first injector 94 is in hermetic contact with an inner surface of the first supporting recessed portion 150. An annular, distal-side seal member 153 attached at a distal portion of the second body 108 of the second injector 96 is in hermetic contact with an inner surface of the second supporting recessed portion 152.

As shown in FIGS. 2 and 3, four mount portions 154a to 154d for fixing the distal-side support portion 100 to the ejector device 90 are provided at the support portion main body 147. A specific configuration of the mount portions 154a to 154d will be described later.

In FIG. 3, the flow path forming portion 148 has a first injection flow path 148a, a second injection flow path 148b, and a sending out flow path 148c formed therein. The first injection flow path 148a opens at a bottom surface of the first supporting recessed portion 150. The fuel gas injected from the first injector 94 flows through the first injection flow path 148a. The first injection flow path 148a is inclined in the direction of arrow Y2 toward the side of arrow X2.

The second injection flow path 148b opens at a bottom surface of the second supporting recessed portion 152. The fuel gas injected from the second injector 96 flows through the second injection flow path 148b. The second injection flow path 148b is inclined in the direction of arrow Y1 toward the side of arrow X2. The sending out flow path 148c extends linearly along the direction of arrow X. The first injection flow path 148a and second injection flow path 148b communicate with the sending out flow path 148c. The sending out flow path 148c opens at an end surface of the flow path forming portion 148 in the direction of arrow X2.

As shown in FIG. 2, two coupling members 160 are disposed between the proximal-side support portion 98 and the distal-side support portion 100. These coupling members 160 are disposed in such a manner that they sandwich the rubber member 101 (the proximal-side rubber member 102 and the distal-side rubber member 104) in the direction of arrow Z. The coupling members 160, proximal-side support portion 98, and distal-side support portion 100 are coupled to each other by bolts 162 and nuts 164.

These coupling members 160 apply a tightening load in the direction of arrow X to the proximal-side rubber member 102 and the distal-side rubber member 104 disposed between the proximal-side support portion 98 and the distal-side support portion 100. In other words, the first injector 94 and the second injector 96 are held down by the proximal-side rubber member 102 and the distal-side rubber member 104 from the direction in which the plungers 114 operate (from the direction of arrow X).

In FIG. 4, the proximal-side rubber member 102 is a vibration damping rubber member for effectively damping low frequency components (for example, components of 800 Hz or lower) of the vibration (hammering of the plungers 114) occurring during operation of the first injector 94 and the second injector 96. The proximal-side rubber member 102 may be formed by using EPDM (Ethylene Propylene Diene Monomer rubber), for example. However, other rubber material than that may be used for the proximal-side rubber member 102.

It is preferable to use a material having a hardness (Shore hardness) of not less than HS30 nor more than HS70 for the proximal-side rubber member 102, and a length of the proximal-side rubber member 102 along the direction of arrow X (the direction in which the plungers 114 operate, i.e. its thickness under the action of the tightening force) is preferably set to be not less than 5 mm nor more than 21 mm. In this case, the vibration occurring during operation of the first injector 94 and second injector 96 can be effectively damped by the proximal-side rubber member 102.

The proximal-side rubber member 102 is held between the first injector 94 and second injector 96, and the proximal-side support portion 98. Specifically, the proximal-side rubber member 102 abuts on the coil cover portion 124 of the first injector 94 and the coil cover portion 124 of the second injector 96. A plate-like, proximal-side shim member 166 for adjusting the tightening force to the proximal-side rubber member 102 is interposed between the proximal-side rubber member 102 and the base portion 140.

The proximal-side shim member 166 abuts on the base portion 140. The proximal-side rubber member 102 is disposed to surround the respective proximal portions of the first injector 94 and the second injector 96. In other words, the proximal-side rubber member 102 and the proximal-side shim member 166 are disposed to surround the first tubular portion 142 and second tubular portion 144.

The thickness and number of the proximal-side shim member(s) 166 may be changed in an arbitrary manner. Further, the proximal-side shim member 166 may be interposed between the proximal-side rubber member 102 and the coil cover portion 124. The proximal-side shim member 166 may be omitted.

The distal-side rubber member 104 is a vibration damping rubber member for effectively damping low frequency components (for example, components of 800 Hz or lower) of the vibration (hammering of the plungers 114) occurring during operation of the first injector 94 and second injector 96. The distal-side rubber member 104 is formed by using the same material as the proximal-side rubber member 102 described above. In other words, the distal-side rubber member 104 has a hardness that is substantially equal to the hardness of the proximal-side rubber member 102. A length of the distal-side rubber member 104 along the direction of arrow X (its thickness under the action of the tightening force) is smaller than the length of the proximal-side rubber member 102 along the direction of arrow X (its thickness under the action of the tightening force).

It is preferable to use a material having a hardness (Shore hardness) of not less than HS30 nor more than HS70 for the distal-side rubber member 104, and a length of the distal-side rubber member 104 along the direction of arrow X (the direction in which the plungers 114 operate, i.e., its thickness under the action of the tightening force) is preferably set to be not less than 2 mm nor more than 13 mm. In this case, the vibration occurring during operation of the first injector 94 and second injector 96 can be effectively damped by the distal-side rubber member 104.

The distal-side rubber member 104 is held between the first injector 94 and second injector 96, and the distal-side support portion 100. Specifically, the distal-side rubber member 104 abuts on the distal-side holding portion 130 of the first injector 94 and the distal-side holding portion 130 of the second injector 96. A plate-like, distal-side shim member 168 for adjusting the tightening force to the distal-side rubber member 104 is interposed between the distal-side rubber member 104 and the distal-side support portion 100.

The distal-side shim member 168 abuts on a bottom surface of a recessed portion 170 formed in a surface of the support portion main body 147 that is directed in the direction of arrow X1. The recessed portion 170 is formed on an outer circumferential side of the first supporting recessed portion 150 and the second supporting recessed portion 152. The distal-side rubber member 104 and the distal-side shim member 168 are disposed to surround the respective distal portions of the first injector 94 and second injector 96.

A plurality of the distal-side shim members 168 may be provided, and the distal-side shim member(s) 168 may be interposed between the distal-side rubber member 104 and the distal-side holding portion 130. The distal-side shim member 168 may be omitted.

As shown in FIGS. 1 and 3, the ejector device 90 is configured to generate a negative pressure by the Venturi effect in the fuel gas guided from the injector device 88 so as to draw in the fuel off-gas in the circulation flow path 58, mix it with the fuel gas, and discharge it to the downstream side.

In FIG. 3, the ejector device 90 includes an ejector body 172, a diffuser 174, and a nozzle 176. The ejector body 172 includes a main body 178 extending in the direction of arrow X, and a plate-like portion 180 provided in the direction of arrow X1 of the main body 178. The main body 178 has a hole portion 182 for guiding the fuel gas guided from the first injector 94 and second injector 96 further to the fuel gas inlet 44a. Part of the distal-side support portion 100 (the flow path forming portion 148) is inserted in the proximal side of the hole portion 182.

An annular rubber seal member 184 attached on an outer surface of the flow path forming portion 148 is in hermetic contact with an inner surface forming the hole portion 182. A connecting port 186, to which piping (not shown) forming the circulation flow path 58 is fitted, is formed in a part of the main body 178 that is located in the direction of arrow X2 from the flow path forming portion 148.

As shown in FIG. 2, a fixing plate 190 is fixed by screw members 189 on an outer surface of the main body 178. The fixing plate 190 is fixed to the inner surface of the cover portion main body 86 by a plurality of (three) screw members 192.

The plate-like portion 180 is fastened to the main body 178 by a plurality of screw members 193 in a state in which the plate-like portion 180 extends in the directions of arrows Y and Z over the main body 178. The injector device 88 is joined to the plate-like portion 180.

In FIG. 3, the diffuser 174 extends in a tubular form in the direction of arrow X and is fixed to the flow path forming portion 148. The diffuser 174 has a draw in port 194 for drawing in the fuel off-gas. The nozzle 176 is positioned at an end of the inner hole 174a of the diffuser 174 in the direction of arrow X1. The nozzle 176 is fitted in an opening of the sending out flow path 148c in the direction of arrow X2.

Figure 5:
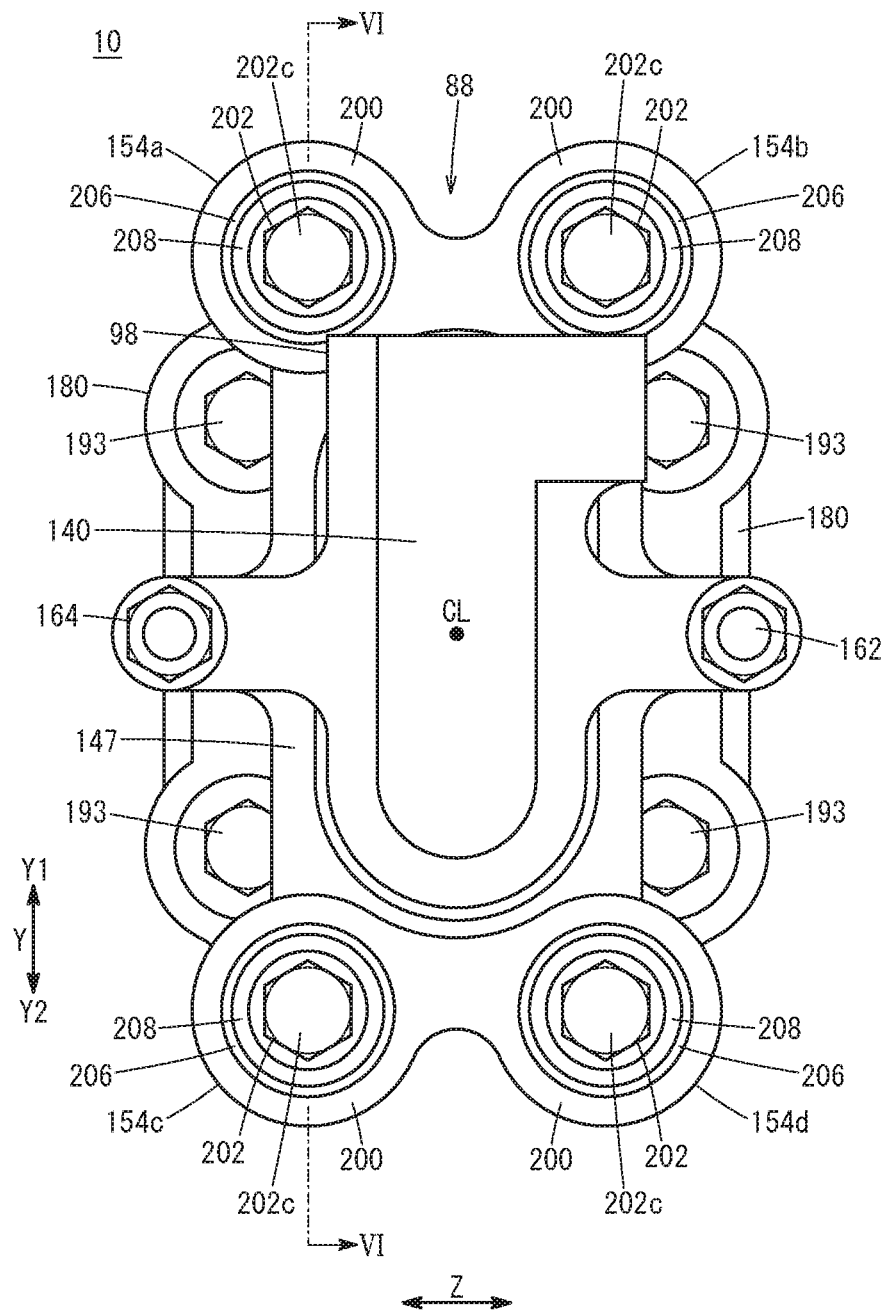
FIG. 5 is a plan view of the fuel gas injection device of FIG. 2 seen from the direction of arrow X1.

As shown in FIGS. 2 and 5, a mount portion 154a and a mount portion 154b are located at one end of the lengthwise direction of the support portion main body 147 (at its end portion in the direction of arrow Y1), and the mount portion 154a and mount portion 154b are located adjacent each other in the widthwise direction (the direction of arrow Z) of the support portion main body 147. A mount portion 154c and a mount portion 154d are located at the other end of the lengthwise direction of the support portion main body 147 (at its end portion in the direction of arrow Y2), and the mount portion 154c and mount portion 154d are located adjacent each other in the widthwise direction of the support portion main body 147. The four mount portions 154a to 154d are disposed in a point symmetric manner about a center line CL of the injector device 88. The center line CL is positioned at the middle of an axis line of the first injector 94 and an axis line of the second injector 96. In other words, the center line CL is positioned at equal distances from, and extends in parallel to, the axis line of the first injector 94 and the axis line of the second injector 96.

As shown in FIG. 6, the mount portion 154a includes a mount body 200, a screw member 202 (fixing member), an inside member 204, an outside member 206, and a mount rubber member 208. The mount body 200 is joined to the distal-side support portion 100. The mount body 200 has a through hole 210 extending along the direction in which the plungers 114 operate.

The screw member 202 is a fastening member that joins the mount body 200 and the ejector body 172 to each other in a state in which the screw member 202 extends in the direction in which the plungers 114 operate. Specifically, concerning the screw member 202, a threaded portion 202b formed on its shaft portion 202a is engaged with a threaded hole 180a of the plate-like portion 180, with its shaft portion 202a inserted in the through hole 210.

The inside member 204 is formed in an annular shape so as to cover the shaft portion 202a of the screw member 202. The inside member 204 is held between a head 202c of the screw member 202 and the plate-like portion 180 so as to be fixed to the plate-like portion 180. The outside member 206 is formed in an annular shape so as to cover an outer circumferential surface of the inside member 204. The outer surface of the outside member 206 is bonded (adhered) to the mount body 200 (to its inner surface forming the through hole 210).

The mount rubber member 208 is a vibration damping rubber member for effectively damping high frequency components (for example, components higher than 800 Hz) of the vibration (working sound) occurring during operation of the first injector 94 and second injector 96. The mount rubber member 208 may be formed by using EPDM (Ethylene Propylene Diene Monomer rubber), for example. However, other rubber material than that may be used for the mount rubber member 208. The mount rubber member 208 has a hardness that is lower than the hardness of the proximal-side rubber member 102 and the hardness of the distal-side rubber member 104.

The mount rubber member 208 is formed in an annular shape so as to be interposed between the inside member 204 and the outside member 206 in the through hole 210. An inner surface of the mount rubber member 208 is bonded (adhered) to an outer surface of the inside member 204. An outer surface of the mount rubber member 208 is bonded (adhered) to an inner surface of the outside member 206. However, the mount rubber member 208 may abut on the outer surface of the inside member 204 and the inner surface of the outside member 206 without being bonded thereto.

The mount portions 154b to 154d are configured in the same manner as the mount portion 154a above. The structure of the mount portions 154b to 154d will therefore be not described herein.

Operation of the fuel cell system 11 thus configured will be described below.

In FIGS. 1 and 3, in the fuel gas supply device 14, the fuel gas is supplied from the fuel gas tank 50 to the introducing flow path 140a of the fuel gas injection device 10 through the fuel gas supply path 52. The fuel gas supplied to the introducing flow path 140a is guided to the first injector 94 through the first inner hole 142a and to the second injector 96 through the second inner hole 144a. Further, the control unit 22 applies an opening control to at least one of the first injector 94 and second injector 96. The fuel gas injected from the first injector 94 is guided from the first injection flow path 148a to the sending out flow path 148c. The fuel gas injected from the second injector 96 is guided from the second injection flow path 148b to the sending out flow path 148c.

Then, the fuel gas guided to the sending out flow path 148c is discharged from the nozzle 176 into the diffuser 174. The fuel gas discharged into the diffuser 174 is supplied to the fuel gas inlet 44a through the hole portion 182. The fuel gas supplied to the fuel gas inlet 44a is introduced into the fuel gas flow field 38 and moves along the fuel gas flow field 38 to be supplied to the anode 34 of the membrane electrode assembly 26.

In FIG. 1, in the oxygen-containing gas supply device 16, the oxygen-containing gas is sent to the oxygen-containing gas supply path 70 under a rotation action of the oxygen-containing gas pump 74. The oxygen-containing gas is supplied to the oxygen-containing gas inlet 46a of the fuel cell stack 12. The oxygen-containing gas is introduced from the oxygen-containing gas inlet 46a into the oxygen-containing gas flow field 40, and moves along the oxygen-containing gas flow field 40 to be supplied to the cathode 36 of the membrane electrode assembly 26.

Thus, at each membrane electrode assembly 26, the fuel gas supplied to the anode 34 and the oxygen in the oxygen-containing gas supplied to the cathode 36 are consumed by electrochemical reactions in the electrode catalyst layers, so as to produce power. In this process, protons are generated at the anode 34, and the protons are conducted through the solid polymer electrolyte membrane 32 to move to the cathode 36. On the other hand, at the cathode 36, protons, electrons, and the oxygen in the oxygen-containing gas produce water. The water thus produced (produced water) penetrate through the electrolyte membrane to reach the anode 34. The produced water thus forms in the fuel cell stack 12 (anode flow field).

Further, in the coolant supply device 18, under the action of the coolant pump 78, the coolant, such as pure water, ethylene glycol, oil, or the like, is supplied from the coolant supply path 76 to the coolant inlet 48a of the fuel cell stack 12. The coolant flows along the coolant flow field 42, cools the power generation cell 24, and is discharged from the coolant outlet 48b to the coolant discharge path 82.

Next, the fuel gas supplied to the anode 34 and partially consumed is discharged as the fuel off-gas from the fuel gas outlet 44b to the fuel gas discharge path 54. The fuel off-gas flows from the fuel gas discharge path 54 to the circulation flow path 58, and is introduced into the ejector device 90. The fuel off-gas introduced into the ejector device 90 is drawn into the inner hole 174a of the diffuser 174 from the draw in port 194 by the action of the negative pressure generated as the fuel gas is discharged from the nozzle 176 into the diffuser 174, and the fuel off-gas is mixed with the fuel gas (see FIGS. 1 and 3).

The fuel off-gas discharged to the fuel gas discharge path 54 is discharged (purged) as needed, under the releasing action of the purge valve 64. Similarly, the oxygen-containing gas supplied to the cathode 36 and partially consumed is discharged from the oxygen-containing gas outlet 46b into the oxygen-containing gas discharge path 72.

The fuel gas injection device 10 and the fuel cell system 11 according to this embodiment offer the following effects.

The injector device 88 includes the injector support portion 97, rubber member 101, and mount portions 154a to 154d. The rubber member 101 is disposed between the first injector 94 and second injector 96 and the injector support portion 97. The mount portions 154a to 154d serve to attach the distal-side support portion 100 to the ejector body 172, and each of the mount portions 154a to 154d includes the mount body 200, screw member 202, and mount rubber member 208.

The mount bodies 200 are joined to the distal-side support portion 100. The screw members 202 join the mount bodies 200 and the ejector body 172 to each other, with the screw members 202 extending in the direction in which the plungers 114 operate. The mount rubber members 208 are each disposed on the outer circumferential side of the shaft portion 202a of the screw member 202.

Thus, the vibration occurring during operation of the first injector 94 and second injector 96 is primarily damped by the rubber member 101, transmitted to the injector support portion 97, and then secondarily damped by the mount rubber members 208, and transmitted to the cover portion 84 (external support member) through the ejector body 172. In this process, since the mount rubber members 208 are disposed on the outer circumferential side of the screw members 202 extending along the operating direction of the plungers 114, it is possible to efficiently damp the vibration transmitted from the injector support portion 97 to the ejector body 172. It is therefore possible to efficiently reduce the transmission, to the cover portion 84, of the vibration occurring during operation of the first injector 94 and second injector 96.

The injector support portion 97 includes the distal-side support portion 100 for supporting the respective distal portions of the first injector 94 and second injector 96, and the proximal-side support portion 98 for supporting the respective proximal portions of the first injector 94 and second injector 96. The rubber member 101 includes the distal-side rubber member 104 held between the first injector 94 and second injector 96 and the distal-side support portion 100 from the operating direction of the plungers 114, and the proximal-side rubber member 102 held between the first injector 94 and second injector 96 and the proximal-side support portion 98 from the operating direction of the plungers 114.

Accordingly, the vibration transmitted toward the distal side during operation of the first injector 94 and second injector 96 is primarily damped by the distal-side rubber member 104 and then secondarily damped by the mount rubber members 208. Further, the vibration transmitted toward the proximal side during operation of the first injector 94 and second injector 96 is damped by the proximal-side rubber member 102. It is thus possible to further efficiently reduce the transmission, to the cover portion 84, of the vibration occurring during operation of the first injector 94 and second injector 96.

The hardness of the mount rubber members 208 is lower than the hardness of the distal-side rubber member 104 and the hardness of the proximal-side rubber member 102. Accordingly, low frequency components of the vibration occurring during operation of the first injector 94 and second injector 96 can be effectively damped by the distal-side rubber member 104 and proximal-side rubber member 102. Further, high frequency components of the vibration occurring during operation of the first injector 94 and second injector 96 can be effectively damped by the mount rubber members 208.

The injector device 88 includes the first injector 94 and the second injector 96 that are disposed in parallel. The distal-side rubber member 104 extends so as to surround the respective distal portions of the first injector 94 and second injector 96. The proximal-side rubber member 102 extends so as to surround the respective proximal portions of the first injector 94 and second injector 96. Accordingly, the vibration occurring during operation of the first injector 94 and second injector 96 can be efficiently damped by the distal-side rubber member 104 and proximal-side rubber member 102.

The mount portions 154a to 154d each include the annular, inside member 204 fixed to the ejector body 172 by the screw member 202, and the annular, outside member 206 bonded to the mount body 200 while being disposed on the outer circumferential side of the inside member 204. The mount rubber member 208 abuts on the outer surface of the inside member 204 and the inner surface of the outside member 206. Thus, the vibration transmitted from the distal-side support portion 100 to the outside member 206 can be damped at the mount rubber member 208 and then transmitted to the ejector body 172 through the inside member 204.

A plurality of mount portions 154a to 154d are disposed in a point symmetric manner about the center line CL of the injector device 88. Accordingly, the vibration transmitted from the first injector 94 and second injector 96 to the distal-side support portion 100 can be further efficiently damped at the plurality of mount portions 154a to 154d.

The ejector body 172 has the hole portion 182 in which a part of the distal-side support portion 100 is inserted, and the rubber seal member 184 in contact with the inner surface forming the hole portion 182 is attached to the flow path forming portion 148 of the distal-side support portion 100 that is inserted in the hole portion 182. Accordingly, the vibration transmitted from the first injector 94 and second injector 96 to the distal-side support portion 100 can be damped by the rubber seal member 184.

The present invention is not limited to the configurations described above. The fuel gas injection device 10 may include one, or two, or three mount portion(s), or five or more mount portions. The fuel gas injection device 10 may include only a single injector, or three or more injectors.

The fuel gas injection device and fuel cell system according to the present invention are not limited to the embodiments described above, and can of course take various configurations without departing from the scope of the present invention.

What is claimed is:

1. A fuel gas injection device comprising an injector device that includes an injector for injecting a fuel gas, and an ejector device that includes an ejector body attached to an external support member and to which the fuel gas injected from the injector is guided, the fuel gas of the ejector device being supplied to a fuel cell,
the injector device comprising:
an injector support portion supporting the injector;
a rubber member disposed between the injector and the injector support portion; and
a mount portion for attaching the injector support portion to the ejector body,
the mount portion comprising:
a mount body joined to the injector support portion;
a fixing member for joining the mount body and the ejector body to each other, with the fixing member extending in an operating direction of a plunger of the injector; and
a mount rubber member disposed on an outer circumferential side of a shaft portion of the fixing member,
wherein the injector support portion includes:
a distal-side support portion supporting a distal portion of the injector; and
a proximal-side support portion supporting a proximal portion of the injector, and the rubber member includes:
a distal-side rubber member held between the injector and the distal-side support portion from the operating direction of the plunger; and
a proximal-side rubber member held between the injector and the proximal-side support portion from the operating direction of the plunger.

2. The fuel gas injection device according to claim 1, wherein the mount rubber member has a hardness that is lower than a hardness of the distal-side rubber member and a hardness of the proximal-side rubber member.

3. The fuel gas injection device according to claim 1, wherein the injector device includes a plurality of injectors disposed in parallel,
the distal-side rubber member extends so as to surround the distal portion of each of the plurality of injectors, and
the proximal-side rubber member extends so as to surround the proximal portion of each of the plurality of injectors.

4. The fuel gas injection device according to claim 1, wherein the mount portion comprises a plurality of mount portions that are disposed in a point symmetric manner about a center line of the injector device.

5. The fuel gas injection device according to claim 1, wherein the ejector body has a hole portion in which a part of the distal-side support portion is inserted, and
a rubber seal member in contact with an inner surface forming the hole portion is attached to the part of the distal-side support portion that is inserted in the hole portion.

6. The fuel gas injection device according to claim 1, wherein the injector support portion comprises a coupling member coupled to the distal-side support portion and the proximal-side support portion such that a tightening force along the operating direction of the plunger acts to the distal-side rubber member and the proximal-side rubber member.

7. The fuel gas injection device according to claim 6, wherein, with the tightening force acting, a thickness of the distal-side rubber member along the operating direction of the plunger is smaller than a thickness of the proximal-side rubber member along the operating direction of the plunger.

8. The fuel gas injection device according to claim 1, wherein the mount rubber member is formed in an annular shape.

9. A fuel gas injection device comprising an injector device that includes an injector for injecting a fuel gas, and an ejector device that includes an ejector body attached to an external support member and to which the fuel gas injected from the injector is guided, the fuel gas of the ejector device being supplied to a fuel cell,
the injector device comprising:
an injector support portion supporting the injector;
a rubber member disposed between the injector and the injector support portion; and
a mount portion for attaching the injector support portion to the ejector body,
the mount portion comprising:
a mount body joined to the injector support portion;
a fixing member for joining the mount body and the ejector body to each other, with the fixing member extending in an operating direction of a plunger of the injector; and
a mount rubber member disposed on an outer circumferential side of a shaft portion of the fixing member,
wherein the mount portion includes:
an annular inside member fixed to the ejector body by the fixing member; and
an annular outside member bonded to the mount body while being disposed on an outer circumferential side of the annular inside member, and
wherein the mount rubber member abuts on an outer surface of the annular inside member and an inner surface of the annular outside member.

10. A fuel cell system comprising a fuel cell and a fuel gas injection device,
the fuel gas injection device comprising an injector device that includes an injector for injecting a fuel gas, and an ejector device that includes an ejector body attached to an external support member and to which the fuel gas injected from the injector is guided, the fuel gas of the ejector device being supplied to the fuel cell,
the injector device comprising:
an injector support portion supporting the injector;
a rubber member disposed between the injector and the injector support portion; and
a mount portion for attaching the injector support portion to the ejector body, the mount portion comprising:
a mount body joined to the injector support portion;
a fixing member for joining the mount body and the ejector body to each other, with the fixing member extending in an operating direction of a plunger of the injector; and
a mount rubber member disposed on an outer circumferential side of a shaft portion of the fixing member,
wherein the injector support portion includes:
a distal-side support portion supporting a distal portion of the injector; and
a proximal-side support portion supporting a proximal portion of the injector, and
the rubber member includes:
a distal-side rubber member held between the injector and the distal-side support portion from the operating direction of the plunger; and
a proximal-side rubber member held between the injector and the proximal-side support portion from the operating direction of the plunger.

11. The fuel cell system according to claim 10, wherein the mount rubber member has a hardness that is lower than a hardness of the distal-side rubber member and a hardness of the proximal-side rubber member.

12. The fuel cell system according to claim 10, wherein the injector device includes a plurality of injectors disposed in parallel,
the distal-side rubber member extends so as to surround the distal portion of each of the plurality of injectors, and
the proximal-side rubber member extends so as to surround the proximal portion of each of the plurality of injectors.

13. The fuel cell system according to claim 10,
wherein the mount portion includes:
an annular inside member fixed to the ejector body by the fixing member; and
an annular outside member bonded to the mount body while being disposed on an outer circumferential side of the annular inside member, and
wherein the mount rubber member abuts on an outer surface of the annular inside member and an inner surface of the annular outside member.

14. The fuel cell system according to claim 10, wherein the mount portion comprises a plurality of mount portions that are disposed in a point symmetric manner about a center line of the injector device.

15. The fuel cell system according to claim 10, wherein the ejector body has a hole portion in which a part of the distal-side support portion is inserted, and
a rubber seal member in contact with an inner surface forming the hole portion is attached to the part of the distal-side support portion that is inserted in the hole portion.

16. The fuel cell system according to claim 10, wherein the injector support portion comprises a coupling member coupled to the distal-side support portion and the proximal-side support portion such that a tightening force along the operating direction of the plunger acts to the distal-side rubber member and the proximal-side rubber member.

17. The fuel cell system according to claim 16, wherein, with the tightening force acting, a thickness of the distal-side rubber member along the operating direction of the plunger is smaller than a thickness of the proximal-side rubber member along the operating direction of the plunger.

18. The fuel cell system according to claim 10, wherein the mount rubber member is formed in an annular shape.

\* \* \* \* \*